No. 785,840. PATENTED MAR. 28, 1905.
C. H. TURNER.
CAR FENDER.
APPLICATION FILED JUNE 25, 1904.
3 SHEETS—SHEET 1.
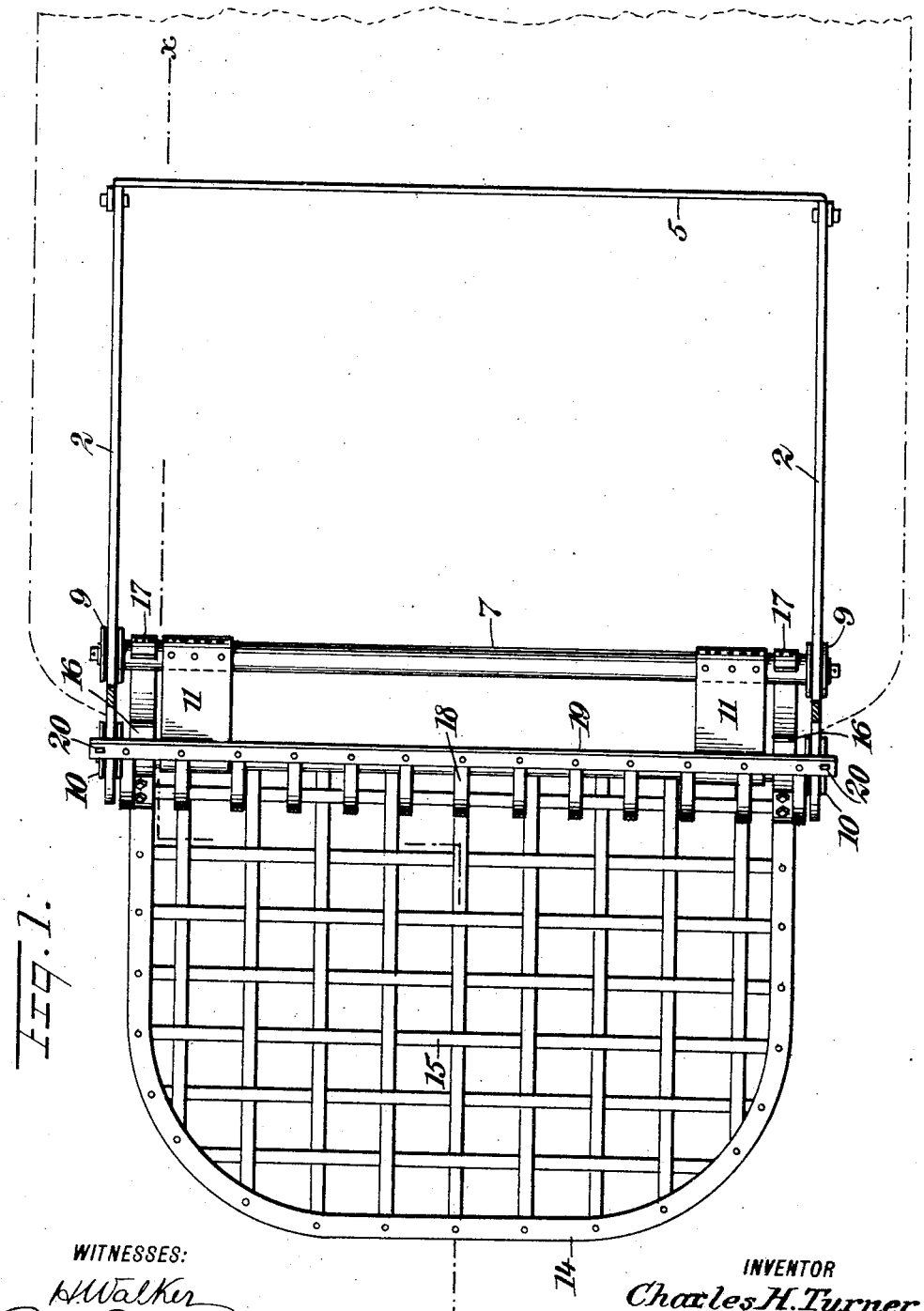
WITNESSES:
H. Walker
C. R. Ferguson
INVENTOR
Charles H. Turner
BY
Munn
ATTORNEYS No. 785,840. PATENTED MAR. 28, 1905.
C. H. TURNER.
CAR FENDER.
APPLICATION FILED JUNE 25, 1904.
3 SHEETS—SHEET 2.
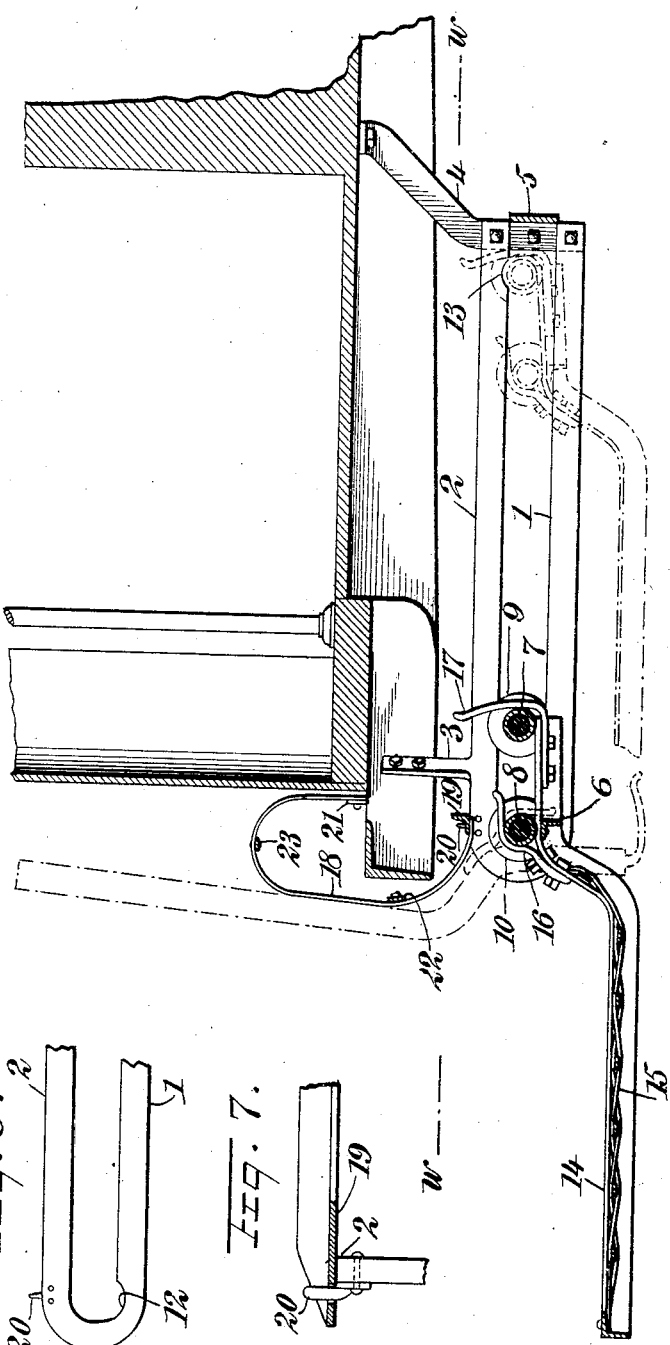
WITNESSES.
H. Walker
INVENTOR
Charles H. Turner
BY
ATTORNEYS

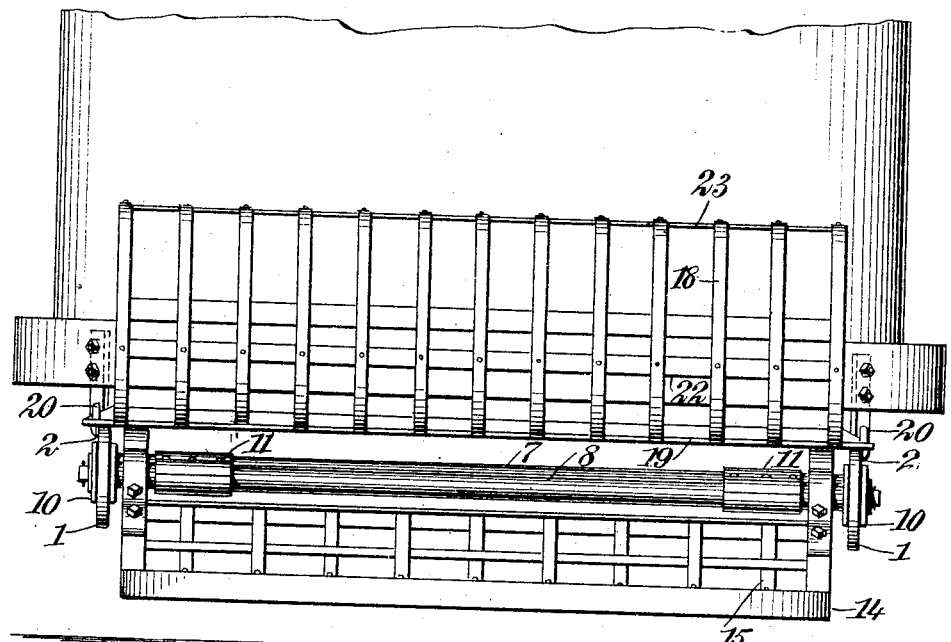
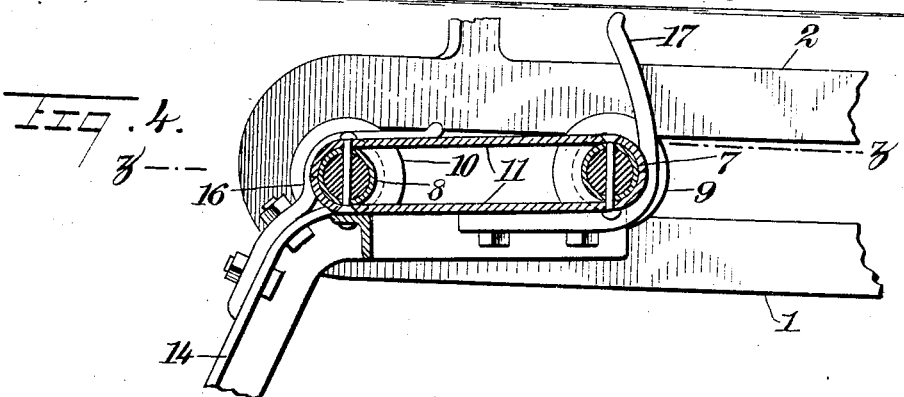
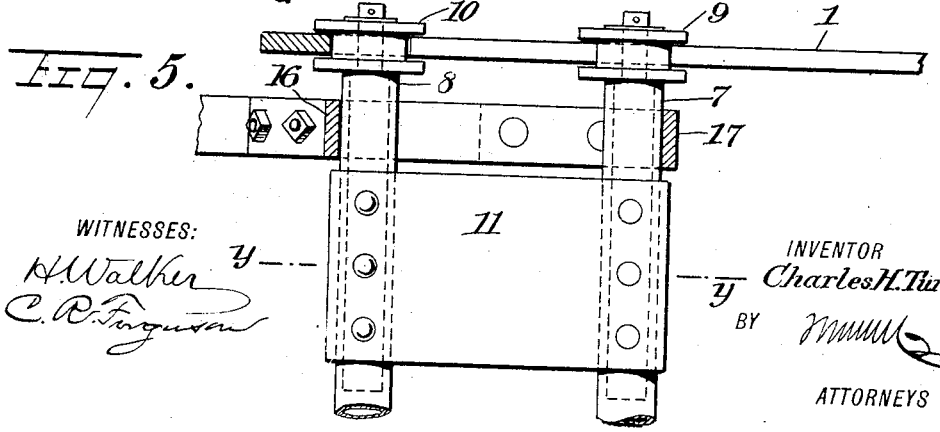

No. 785,840. Patented March 28, 1905.

UNITED STATES PATENT OFFICE.

CHARLES H. TURNER, OF NEW YORK, N. Y., ASSIGNOR OF ONE-HALF TO WILL C. TURNER, OF NEW YORK, N. Y.

CAR-FENDER.

SPECIFICATION forming part of Letters Patent No. 785,840, dated March 28, 1905.

Application filed June 25, 1904. Serial No. 214,109.

*To all whom it may concern:*

Be it known that I, CHARLES H. TURNER, a citizen of the United States, and a resident of the city of New York, borough of Brooklyn, in the county of Kings and State of New York, have invented a new and Improved Car-Fender, of which the following is a full, clear, and exact description.

This invention relates to improvements in fenders for street-cars, the object being to provide a fender of comparatively light yet strong construction that may be constructed at a small cost, that may be readily applied to a car without requiring changes in the car structure, and that will easily slide underneath a car upon striking an obstruction other than a person, such as a truck or the like, thus avoiding possible breaking or damage of the fender by meeting such obstruction and preventing essential damage to a vehicle against which it may strike.

Other objects of the invention will appear in the general description.

I will describe a car-fender embodying my invention and then point out the novel features in the appended claims.

Reference is to be had to the accompanying drawings, forming a part of this specification, in which similar characters of reference indicate corresponding parts in all the figures.

Figure 1 is a plan view, partly in section on the line *w w* of Fig. 2, of a car-fender embodying my invention. Fig. 2 is a section on the line *x x* of Fig. 1. Fig. 3 is a front elevation. Fig. 4 is a detail section on the line *y y* of Fig. 5, showing a truck construction employed. Fig. 5 is a section on the line *z z* of Fig. 4. Fig. 6 is a fragmentary view showing the front end of the truck runway or track, and Fig. 7 is a detail view illustrating the manner of attaching a buffer.

The fender mechanism comprises a runway or track consisting of lower members 1 and upper members 2, these tracks being secured to the under side of a car by means of hangers 3, near the front end of the track, and hangers 4, secured to the rear end of the track. Each track or runway consists of a single length of metal, which is bent to form a closed front end, and the rear end is closed by the hanger 4. The opposite hangers are braced by a cross-bar 5, while the rear portion of the fender is connected by a cross-bar 6, consisting, preferably, of angle-iron. Movable on the runways or tracks is a truck, consisting of a rear shaft 7 and a front shaft 8, upon which are mounted grooved wheels 9 10. The said roller 9 runs upon the upper member 2 of the track, and its flange engages with the lower member thereof, while the roller 10 runs on the lower member, with its flange engaging the upper member. The shafts 7 8 are connected by means of plates 11, which, as here shown, extend over the upper and under sides of the shafts. The lower member 1 of each track is provided at its forward end with a depression 12 for receiving the front rollers when the fender is in its forward position, thus forming a brake or stop to prevent inward or rearward movement of the fender supported by the trucks excepting when striking a truck or other heavy object. The upper member 2 of each track is provided at the rear end with a depression 13 for holding the truck in its inward position.

The fender consists of a frame 14, which, for the sake of lightness with sufficient strength, is made of angle-iron, and secured to the frame is a flexible material 15. The side members of the frame are curved upward and then extended rearward, and attached to these rearwardly-extended portions are hooks 16, designed to engage over the front shaft 8, and extended upward from the rear ends of these rearwardly-extended portions are arms 17, which engage against the rear shaft 7 and prevent the fender from being drawn forward and detached from the truck when in lowered position. It is to be understood, however, that other means may be employed for attaching the fender to the truck, providing that such connection be so arranged as to permit the upward swinging of the fender with relation to the truck, as indicated by the dotted lines in Fig. 2.

Removably connected to the car and to the upper members of the runway or tracks is a buffer consisting of spring-plates 18, which at their lower ends are connected to an angle-iron 19, having openings at its ends for receiving fingers 20, attached to the members 2 of the tracks. These spring-plates are curved upward and then downward and are connected at their upper ends by a cross-bar 21, which rests upon the sill of the car, as clearly indicated in Fig. 2. This buffer is designed to relieve the shock of the car should the fender come in contact with a vehicle and be forced inward, and it is also designed to prevent injury to a person who might be struck by the fender and fall thereon. For the purpose of strength the several plates of the buffer are further connected by cross-bars 22 23. The normal position of the fender is as indicated in Figs. 1 and 2. Should the forward end of the fender come in contact with a vehicle or similar obstruction, it would be forced inward along the runway or track to the position indicated in dotted lines in Fig. 2. When it is desired to transfer the fender from one end of the car to the other end, it is to be swung upward, releasing the arms 17 from the rear shaft of the truck, and then the hook members 1 may be lifted from the front shaft.

It will be readily seen that a fender embodying my invention may be readily applied to the prevailing form of cars, and as it is comparatively light may be easily transferred from end to the other of the car, it being understood, of course, that the runway or track is arranged underneath the platform at each end.

Having thus described my invention, I claim as new and desire to secure by Letters Patent—

1. The combination with a car, of a track secured to the under side thereof, a truck movable on the track, and a fender having swinging connection with the truck whereby the fender may be swung to vertical position in front of the car.

2. The combination with a car, of a track secured to the under side thereof, a truck movable on the track, and a fender having swinging and removable connection with the truck.

3. The combination with a car, of a runway or track comprising upper and lower members, a truck consisting of a pair of shafts, grooved rollers on said shafts engaging with the upper and lower members of the runway or track, the lower members of said track being provided near the forward end with depressions, and the upper members being provided near the rear end with depressions, and a fender having swinging connection with the front shaft and having portions engaging with the rear shaft.

4. The combination with a car, of track members secured to the under side thereof, a truck movable on the track members and having front and rear shafts, a fender comprising a frame, the side members of which at the rear end are curved upward and then extended horizontally, hook portions on the rear ends of the side members for engaging with the front shaft, and arms on said horizontally-disposed portions for engaging against the rear shaft.

5. The combination with a car, of track members secured to the under side thereof, a fender movable on the track members, a buffer comprising a plurality of spring-plates, a cross-bar with which the lower ends of the plates are connected, the said cross-bar having perforations at its ends, fingers on the track members for engaging in said perforations, and a cross-bar connecting the upper ends of the said plates.

In testimony whereof I have signed my name to this specification in the presence of two subscribing witnesses.

CHARLES H. TURNER.

Witnesses:
JNO. M. RITTER,
C. R. FERGUSON.